United States Patent
Reineck

(10) Patent No.: US 6,733,020 B2
(45) Date of Patent: May 11, 2004

(54) SUSPENSION TRAILING ARM

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 19 days.

(21) Appl. No.: 10/194,512

(22) Filed: Jul. 12, 2002

(65) Prior Publication Data

US 2004/0007843 A1 Jan. 15, 2004

(51) Int. Cl.$^7$ .................... B60G 09/02; B60G 21/055
(52) U.S. Cl. ................... 280/124.107; 280/124.116
(58) Field of Search .................. 280/124.107, 124.116

(56) References Cited

U.S. PATENT DOCUMENTS

| | | | | |
|---|---|---|---|---|
| 5,037,126 A | * | 8/1991 | Gottschalk et al. | 280/124.116 |
| 5,203,585 A | * | 4/1993 | Pierce | 280/124.116 |
| 5,443,280 A | * | 8/1995 | Kawaguchi et al. | 280/124.128 |
| 5,639,110 A | * | 6/1997 | Pierce et al. | 280/124.116 |
| 6,039,336 A | * | 3/2000 | Frey | 280/124.128 |
| 6,196,564 B1 | * | 3/2001 | Hawener et al. | 280/124.162 |
| 6,508,482 B2 | * | 1/2003 | Pierce et al. | 280/124.116 |
| 6,557,875 B2 | * | 5/2003 | Schlosser et al. | 280/124.153 |
| 2001/0030406 A1 | * | 10/2001 | Pierce | 280/124.116 |

FOREIGN PATENT DOCUMENTS

WO     WO 01/381113     5/2001

OTHER PUBLICATIONS

"ADL Series Drive Axle Air–Ride Suspension", Freightliner, Nov. 2001, pp. 1–2, Muskegon, Mi.
U.S. patent application: "Trailing Arm Suspension Anti–Roll Bar", filed on Jul. 12, 2002.
U.S. patent application: "Heavy Duty Trailing Arm Suspension System", filed Jul. 12, 2002. Inventor Benjamin R. Reineck.

* cited by examiner

*Primary Examiner*—Charles T. Jordan
*Assistant Examiner*—Bret Hayes
(74) *Attorney, Agent, or Firm*—Carlson, Gaskey & Olds, P.C.

(57) ABSTRACT

A trailing arm is provided for a vehicle suspension including a forward portion. The forward portion extends longitudinally to a rearward portion with the trailing arm having at least a portion with an open bottom. The trailing arm preferably has a generally U-shaped cross-section over a substantial portion of its length. A bushing assembly is secured to the forward portion defining a first pivotal connection by which the trailing arm is secured to the frame. An air spring support plate is secured to the rearward portion opposite the open bottom. Preferably, the trailing arm tapers inwardly from the rearward portion to the forward portion to provide increased structural rigidity in the area of the trailing arm that supports the axle and other suspension components. The trailing arm is formed of a sheet of metal to provide the generally U-shaped cross-section. The bushing assembly is welded to one end portion of trailing arm to define the first pivotal connection, and an axle attachment member is welded to another portion of the trailing arm. Brackets and plates for supporting suspension components such as air springs, an anti-roll bar, and shock absorbers may be welded to the trailing arm.

17 Claims, 2 Drawing Sheets

SUSPENSION TRAILING ARM

BACKGROUND OF THE INVENTION

This invention relates to a heavy duty vehicle suspension system, and more particularly, the invention relates to a trailing arm structure and method for manufacturing same.

Various suspension systems have been employed for heavy duty vehicle applications. For example, trailing arm suspensions have been used in motor homes in which is a forward portion of a pair of opposing trailing arms are pivotally attached to the frame. The wheel ends are supported on the trailing arms, and suspension components are arranged between the trailing arm and the frame.

Typically trailing arms are designed to withstand the bending forces of the suspension components acting on the trailing arm and inputs received through the wheel ends from the road way. The trailing arms may be subjected to significant bending and torsional inputs, and as a result, must be designed with sufficient structural rigidity. Some trailing arms are rather large cast components having significant weight. Other trailing arms have been proposed such as side plates that are bolted together. An adapter plate is supported between the side plates to support the suspension components. However, such trailing arms typically do not have sufficient rigidity for the intended application. Moreover, these trailing arms have required the use of numerous bushings and fasteners. Therefore, what is needed is a trailing arm with reduced weight and of sufficient structural rigidity to withstand bending inputs while minimizing torsional inputs acting on the trailing arm.

SUMMARY OF THE INVENTION AND ADVANTAGES

The present invention provides a trailing arm for a vehicle suspension including a forward portion. The forward portion extends longitudinally to a rearward portion with the trailing arm having at least a portion with an open bottom. The trailing arm preferably has a generally U-shaped cross-section over a substantial portion of its length. A bushing assembly is secured to the forward portion defining a first pivotal connection by which the trailing arm is secured to the frame. An air spring support plate is secured to the rearward portion opposite the open bottom. Preferably, the trailing arm tapers inwardly from the rearward portion to the forward portion to provide increased structural rigidity in the area of the trailing arm that supports the axle and other suspension components. The trailing arm is formed of a sheet of metal to provide the generally U-shaped cross-section. The bushing assembly is welded to one end portion of trailing arm to define the first pivotal connection, and an axle attachment member is welded to another portion of the trailing arm. Brackets and plates for supporting suspension components such as air springs, an anti-roll bar, and shock absorbers may be welded to the trailing arm. The main portion of the trailing arm does not have any welds.

Accordingly, the above invention provides a trailing arm with reduced weight and of sufficient structural rigidity to withstand bending inputs while minimizing torsional inputs acting on the trailing arm.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
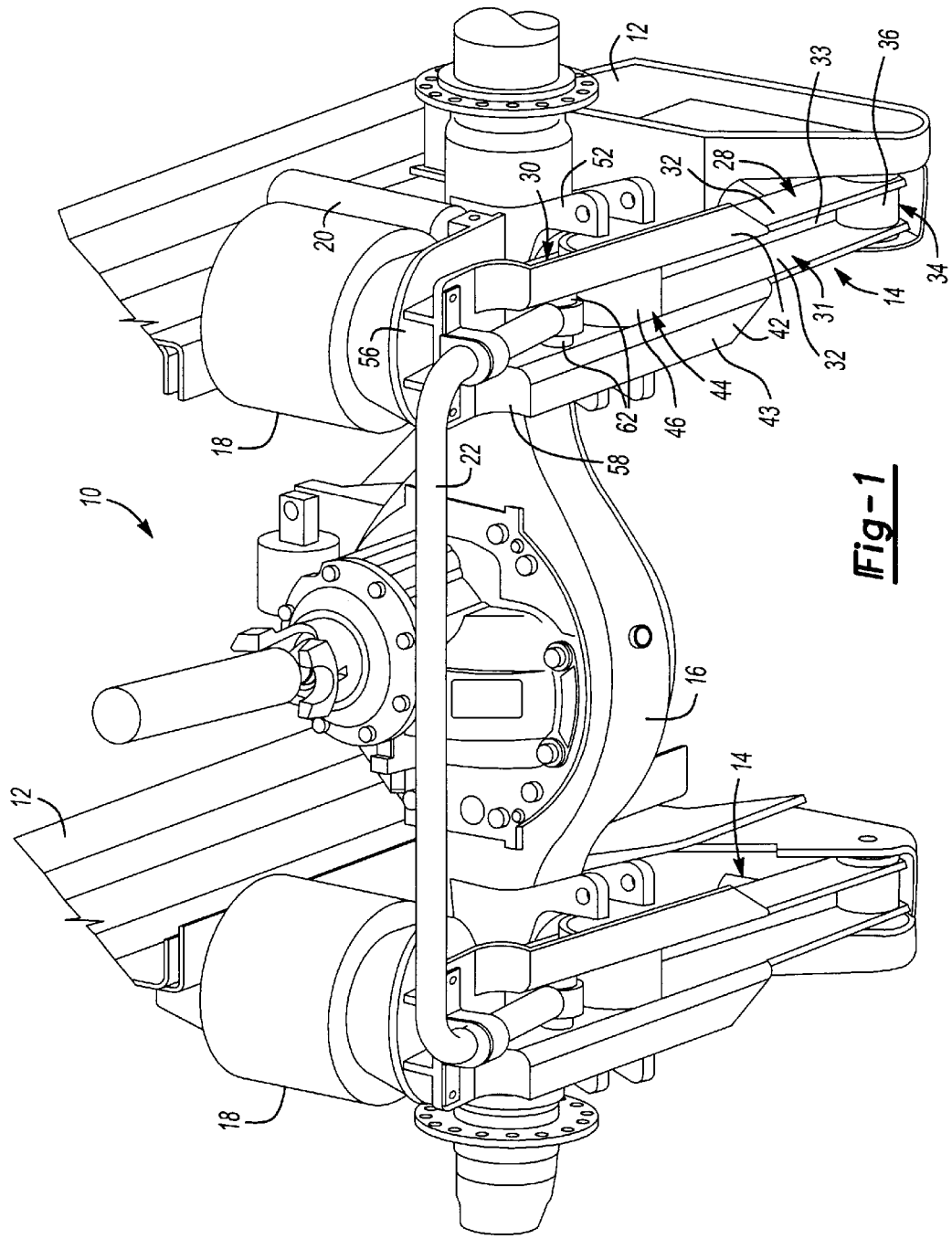
FIG. 1 is a bottom perspective view of a heavy duty suspension system using the present invention trailing arm.

A suspension system 10 is shown in FIG. 1. The suspension 10 includes a frame 12 that may include multiple structural of components welded and fastened together. A pair of spaced apart longitudinally extending trailing arms 14 are pivotally supported by the frame 12. The suspension 10 depicted in FIG. 1 is suited for a motor home application in which the engine is located rearward of the suspension. Air springs 18 and shock absorbers 20 are arranged between each of the trailing arms 14 and the frame 12. An anti-roll bar 22 may extend laterally between the trailing arms 14 to provide stability to the vehicle during a turning maneuver.

Figure 2:
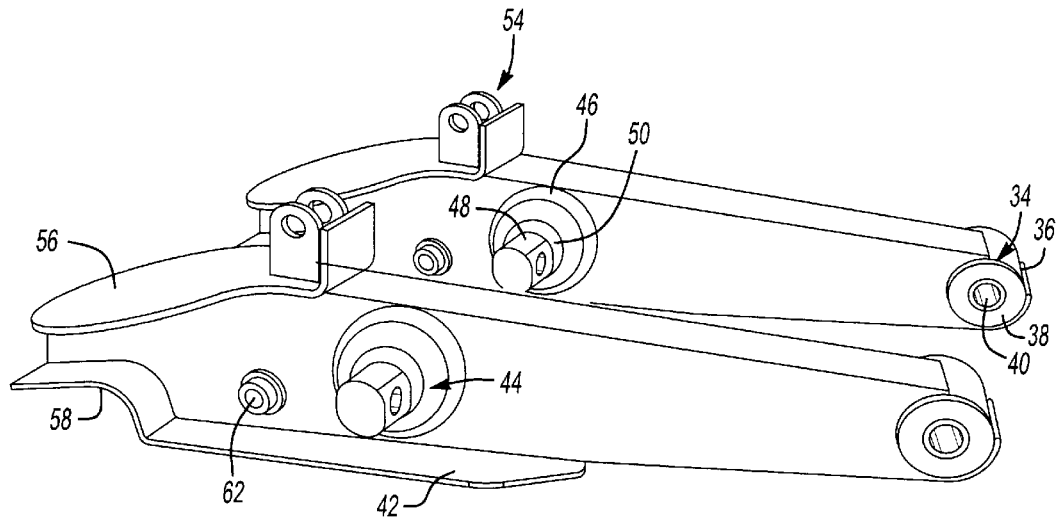
FIG. 2 is a side perspective view of the trailing arm shown in FIG. 1.
Figure 3:
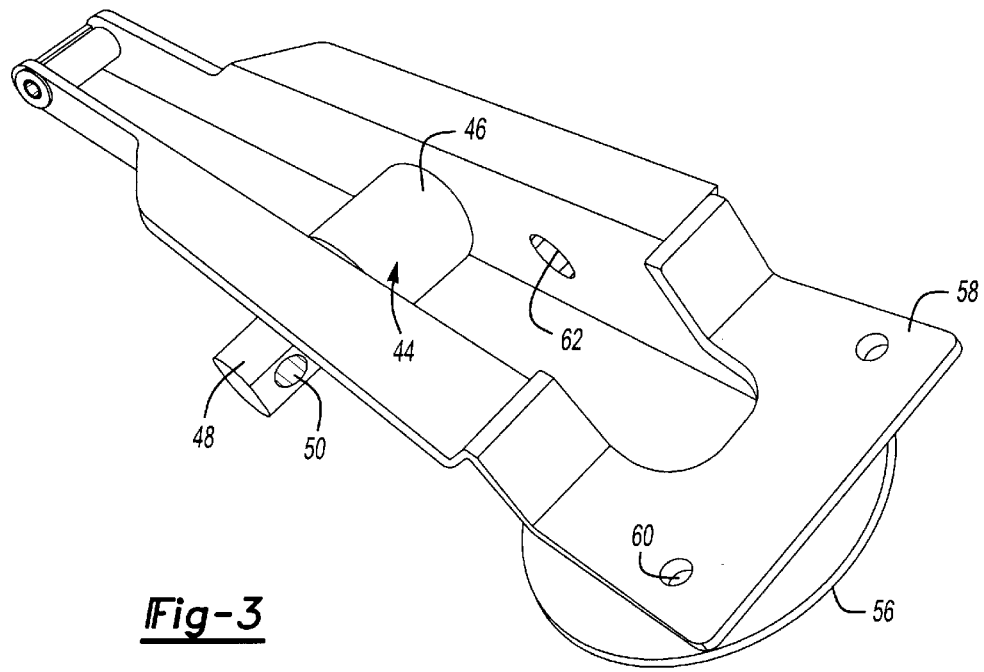
FIG. 3 is a bottom rear perspective view of the present invention trailing arm.

The trailing arm 14 is pictured in FIGS. 1–3. The trailing arm 14 includes a forward portion 28 extending to a rearward portion 30. Preferably, the trailing arm 14 has a U-shaped cross-section along a substantial portion of the length of the trailing arm 14 fanning an open bottom 31 or longitudinal channel. The U-shaped is defined by opposing generally vertical sides 32 and an upper wall 33 adjoining the opposing sides 32. The opposing sides 32 may taper inward from the rearward 32 to the forward 28, portion to provide increased structural rigidity at the rear of the trailing arm 14 where many of the suspension components are supported on the trailing arm.

A bushing assembly 34 defining a first pivotal connector is secured to the forward portion 28 of the trailing arm preferably by welding. The bushing assembly 34 includes an outer sleeve 36 welded to the trailing arm. The opposing sides 32 surround approximately 270° of the outer sleeve 36. Preferably, the opposing sides 32 surrounds 180° or less of the outer sleeve 36 for ease of assembly. An inner bushing 40 is secured to the outer sleeve 36 by a resilient member 38, as is well known in the art. However, it is to be understood that the bushing assembly could be any suitable configuration.

Lateral flanges 42 may extend outwardly away from one another from the opposing sides 32. The lateral flanges 42 are located in the area in need of additional structural rigidity to counteract bending forces. For example the lateral flanges 42 may be located beneath the axle 16, air spring 18 and shock absorber 20. The lateral flanges 42 may define a bottom surface 43 or alternatively, the bottom surface 43 may be defined by the edges of the lower portions of the opposing sides 32. An axle attachment member 44 is secured to the trailing arm 14 such as by welding a sleeve 46 to the opposing sides 32. An axle pin 48 may be supported in the sleeve and may include opposing members having apertures 50 for receiving an axle support bracket 52 using a threaded fastener. A material is arranged between the sleeve 46 and the axle pin 48 to laterally locate the pin 48 and the sleeve 46 and permit relatively frictionless rotational movement of the pin 48 in the sleeve 46.

A shock absorber bracket 54 may be welded to the upper portion of the trailing arm. An air spring support plate 56 may be welded to the rearward portion 30 of the trailing arm 14 and preferably located generally in the center of the trailing area in the lateral direction. In this manner, the torsional input on the trailing arm is minimal. More specifically, the air spring support plate 56 may be welded to opposing sides 32 to form the upper wall 33 for a portion of the trailing arm 14. The shock absorber bracket 54 may be secured to the air spring support plate 56.

An anti-roll bar support plate 58 may be welded to the lower portion of the rearward portion 30 of the trailing arm 14. The anti-roll bar support plate 58 includes apertures 60 for receiving a bracket that supports the anti-roll bar 22 on the trailing arm 14. A portion of the anti-roll bar support plate 58 may be spaced from the bottom surface 43 so that the ends of the anti-roll bar 22 may be packaged compactly within the trailing arm 14 so as not to reduce the ground clearance of the suspension 10. Spaced apart bushings 62 may be secured to either of the opposing sides 32 to define a second pivotal connection for receiving the end of the anti-roll bar 22. The anti-roll bar support plate 58 may be welded to the opposing sides 32 and the lateral flanges 42 to provide increase structural rigidity.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailing arm for a vehicle suspension comprising:
   a forward portion extending longitudinally to a rearward portion with said trailing arm having at least a portion with an open bottom defined by a generally U-shaped cross-section, said U-shaped cross-section is defined by opposing sides and an upper wall adjoining said opposing sides;
   a bushing assembly secured to said forward portion defining a first pivotal connection;
   an air spring support plate secured to said rearward portion opposite said open bottom; and
   a shock absorber bracket secured to said upper wall.

2. The trailing arm according to claim 1, wherein said trailing arm includes opposing sides tapering inwardly from said rearward portion to said forward portion.

3. The trailing arm according to claim 1, wherein said rearward portion includes generally vertical opposing sides defining said open bottom with lateral flanges extending outwardly from each of said opposing sides and away from one another.

4. The trailing arm according to claim 3, wherein an axle attachment member is supported by said opposing sides and above said lateral flanges.

5. The trailing arm according to claim 4, wherein said axle attachment member includes a sleeve secured by a old bead between said opposing sides with said sleeve supporting an axle pin or rotation relative to said sleeve.

6. The trailing arm according to claim 5, wherein said axle pin includes opposing members extending beyond said sleeve with said members including an aperture for receiving an axle support bracket.

7. The trailing arm according to claim 1, wherein said U-shaped cross-section is defined by opposing sides and an upper wall adjoining said opposing sides.

8. The trailing arm according to claim 5, wherein an air spring support plate is secured to said opposing sides to form said upper wall centered generally between said opposing sides, and said axle pin arranged between said air spring support plate and said lateral flanges.

9. A trailing arm for a vehicle suspension comprising:
   forward portion extending longitudinally to a rearward portion with said trailing arm having at least a portion with an open bottom defined by a generally U-shaped cross-section;
   a bushing assembly secured to said forward portion defining a first pivotal connection;
   an air spring support plate secured to said rearward portion secured to said rearward portion opposite said open bottom; and wherein said trailing arm includes a bottom surface bounding said open bottom with an anti-roll bar support plate having a portion spaced from said bottom surface and secured to opposing sides of said trailing arm.

10. The trailing arm according to claim 9, wherein said anti-roll bar support plate includes a generally horizontal portion including apertures for receiving an anti-roll bar bracket, an a generally vertical portion adjoining said horizontal portion and secured to said bottom surface.

11. The trailing arm according to claim 9, wherein spaced bushings defining a second pivotal connection are secured to said opposing sides for securing an end of an anti-roll bar thereto.

12. The trailing arm according to claim 1, wherein said bushing assembly includes a sleeve welded to said forward portion of said trailing arm.

13. The trailing arm according to claim 12, wherein said trailing arm surrounds said sleeve approximately 270°.

14. A method of manufacturing a trailing arm comprising the steps of:
   a) bending a sheet of metal to define a trailing arm having a generally U-shaped cross-section with lateral flanges extending outwardly away from a longitudinal opening;
   b) welding a bushing assembly to one end portion of the trailing arm to define a first pivotal connection;
   c) welding an axle attachment member to another portion of the trailing arm.

15. The method according to claim 14, including d) welding an anti-roll bar support plate the trailing arm.

16. The method according to claim 14, including e) welding an air spring support plate to the trailing arm.

17. The method according to claim 14, including f) welding spaced bushings defining a second pivotal connection to the trailing arm.

* * * * *

UNITED STATES PATENT AND TRADEMARK OFFICE
CERTIFICATE OF CORRECTION

PATENT NO. : 6,733,020 B2
DATED : May 11, 2004
INVENTOR(S) : Reineck

It is certified that error appears in the above-identified patent and that said Letters Patent is hereby corrected as shown below:

Column 3,
Line 53, "old" should be -- weld --

Column 4,
Line 12, insert -- a -- before "forward"
Line 28, "an" should read -- and --

Signed and Sealed this

Seventeenth Day of August, 2004

JON W. DUDAS
*Acting Director of the United States Patent and Trademark Office*